United States Patent
Shao et al.

(10) Patent No.: US 8,135,400 B2
(45) Date of Patent: Mar. 13, 2012

(54) METHOD AND SYSTEM FOR DEVICE DISCOVERY IN WIRELESS COMMUNICATION

(75) Inventors: Huai-Rong Shao, Santa Clara, CA (US); Harkirat Singh, Santa Clara, CA (US); Xiangping Qin, San Jose, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 815 days.

(21) Appl. No.: 12/014,693

(22) Filed: Jan. 15, 2008

(65) Prior Publication Data

US 2008/0176561 A1    Jul. 24, 2008

Related U.S. Application Data

(60) Provisional application No. 60/881,441, filed on Jan. 19, 2007.

(51) Int. Cl.
*H04W 4/00* (2009.01)
(52) U.S. Cl. .................. 455/434; 455/515; 370/329
(58) Field of Classification Search .................. None
See application file for complete search history.

(56) References Cited

U.S. PATENT DOCUMENTS

| | | | |
|---|---|---|---|
| 5,613,200 A | 3/1997 | Hamabe | |
| 5,819,182 A | 10/1998 | Gardner et al. | |
| 5,963,852 A | 10/1999 | Schlang et al. | |
| 6,330,459 B1 | 12/2001 | Crichton et al. | |
| 6,526,036 B1 | 2/2003 | Uchida et al. | |
| 6,853,629 B2 | 2/2005 | Alamouti et al. | |
| 6,980,839 B2 | 12/2005 | DaCosta | |
| 7,079,509 B2 | 7/2006 | Belcea | |
| 7,085,572 B2 | 8/2006 | Ishida | |

(Continued)

FOREIGN PATENT DOCUMENTS

KR    10-2002-0038823 A    5/2002

(Continued)

OTHER PUBLICATIONS

Notification of Transmittal of the International Search Authority, Written Opinion for International Application No. PCT/KR2008/000316 dated Apr. 29, 2008, 11 pages.

(Continued)

*Primary Examiner* — Erika A Gary
(74) *Attorney, Agent, or Firm* — Kenneth L. Sherman, Esq.; Michael Zarrabian, Esq.; Myers Andras Sherman & Zarrabian LLP (57) ABSTRACT

The present invention provides a method and a system for device discovery in wireless communication. One implementation involves scanning one or more wireless channels to discover a partner wireless station for a new transmission, by detecting peak energy and beacons on each scanned channel. If a beacon is not detected, then selecting the clearest channel among the scanned channels, and transmitting beacons on the clearest channel. Upon detecting a beacon from a partner station, establishing association with the partner station and selecting a wireless data channel for communication with the partner station. Another implementation involves discovering a partner wireless station to establish a data channel for communication with a discovering station that is associated with a coordinator station, and transmitting a bandwidth reservation request to the coordinator to reserve channel time for control message exchange between the discovering station and the partner station.

23 Claims, 8 Drawing Sheets

U.S. PATENT DOCUMENTS

| | | | |
|---|---|---|---|
| 7,099,689 B2 | 8/2006 | Bahl et al. | |
| 7,103,344 B2 | 9/2006 | Menard | |
| 7,120,392 B2 | 10/2006 | Chu et al. | |
| 7,126,927 B2 | 10/2006 | Heijenk | |
| 7,155,264 B2 | 12/2006 | Twitchell | |
| 7,209,771 B2 | 4/2007 | Twitchell | |
| 7,227,851 B1 | 6/2007 | Gopalakrishnan et al. | |
| 7,272,134 B2 | 9/2007 | Iwama et al. | |
| 7,280,834 B2 | 10/2007 | Takarabe | |
| 7,359,733 B2 | 4/2008 | Liang et al. | |
| 7,519,399 B2 | 4/2009 | Suzuki | |
| 7,596,367 B2 | 9/2009 | Kawasaki | |
| 7,653,163 B2 | 1/2010 | Sadri et al. | |
| 7,724,656 B2 | 5/2010 | Sågfors et al. | |
| 7,792,066 B2 | 9/2010 | Fujii et al. | |
| 7,809,835 B2 | 10/2010 | Reunamaki et al. | |
| 7,822,440 B2 | 10/2010 | Park et al. | |
| 7,826,471 B2 | 11/2010 | Wilson et al. | |
| 7,843,819 B1 | 11/2010 | Benveniste | |
| 7,844,298 B2 | 11/2010 | Riley | |
| 7,848,706 B2 | 12/2010 | Vilzmann et al. | |
| 7,865,183 B2 | 1/2011 | Salokannel et al. | |
| 7,957,777 B1 | 6/2011 | Vu et al. | |
| 2003/0078062 A1 | 4/2003 | Burr | |
| 2004/0002357 A1 | 1/2004 | Benveniste | |
| 2004/0063458 A1 | 4/2004 | Hori et al. | |
| 2004/0064309 A1 | 4/2004 | Kosai | |
| 2005/0083873 A1 | 4/2005 | Yamamoto | |
| 2006/0045035 A1 | 3/2006 | Liu | |
| 2006/0067283 A1 | 3/2006 | So et al. | |
| 2006/0073847 A1 | 4/2006 | Pirzada et al. | |
| 2006/0142034 A1* | 6/2006 | Wentink et al. | 455/515 |
| 2006/0194564 A1 | 8/2006 | Hokimoto et al. | |
| 2006/0198353 A1 | 9/2006 | Wason et al. | |
| 2006/0209772 A1 | 9/2006 | Fang et al. | |
| 2006/0217062 A1 | 9/2006 | Saffre et al. | |
| 2006/0251256 A1 | 11/2006 | Asokan et al. | |
| 2006/0268802 A1 | 11/2006 | Faccin | |
| 2007/0253391 A1 | 11/2007 | Shao et al. | |
| 2007/0268972 A1 | 11/2007 | Kim | |
| 2007/0286136 A1 | 12/2007 | Rittle et al. | |
| 2008/0002652 A1 | 1/2008 | Gupta et al. | |
| 2008/0005219 A1 | 1/2008 | Nabar et al. | |
| 2008/0031208 A1 | 2/2008 | Abhishek et al. | |
| 2008/0056390 A1 | 3/2008 | Rainbolt et al. | |
| 2008/0130617 A1 | 6/2008 | Singh et al. | |
| 2008/0175197 A1 | 7/2008 | Shao et al. | |
| 2008/0175198 A1 | 7/2008 | Singh et al. | |
| 2008/0175199 A1* | 7/2008 | Shao et al. | 370/329 |
| 2008/0176521 A1 | 7/2008 | Singh et al. | |
| 2008/0177886 A1 | 7/2008 | Singh et al. | |
| 2009/0185489 A1 | 7/2009 | Ruffini et al. | |
| 2011/0002243 A1 | 1/2011 | Sherman et al. | |

FOREIGN PATENT DOCUMENTS

| | | | |
|---|---|---|---|
| KR | 1020020038823 A | 5/2002 | |
| KR | 1020040069516 A | 8/2004 | |
| WO | 02067459 A1 | 8/2002 | |

OTHER PUBLICATIONS

Notification of Transmittal of the International Search Authority, Written Opinion for International Application No. PCT/KR2008/000323 dated May 6, 2008, 10 pages.

Notification of Transmittal of the International Search Authority, Written Opinion for International Application No. PCT/KR2008/000318 dated May 6, 2008, 9 pages.

Hitachi, Ltd. et al., "High-Definition Multimedia Interface (HDMI) Specification Version 1.2," HDMI Licensing, LLC, Aug. 22, 2005, pp. 1-214, United States.

IEEE Computer Society, "802.15.3™ IEEE Standard for Information Technology—Telecommunications and Information Exchange Between Systems—Local and Metropolitan Area Networks—Specific Requirements, Part 15.3: Wireless Medium Access Control (MAC) and Physical Layer (PHY) Specifications for High Rate Wireless Personal Area Networks (WPANs)," IEEE, Sep. 29, 2003, pp. i-315, New York, United States.

Multiband OFDM Alliance (MBOA) et al., "Distributed Medium Access Control (MAC) for Wireless Networks Draft 0.99," MBOA Special Interest Group and WiMedia Alliance, Inc., Nov. 1, 2005, pp. i-176, United States.

ECMA International, "High Rate Ultra Wideband PHY and MAC Standard," Standard ECMA-368, 1st Edition, ECMA International, Dec. 2005, pp. i-312, Geneva, Switzerland.

Hitachi, Ltd. et al., "High-Definition Multimedia Interface (HDMI) Specification Version 1.2," HDMI Licensing, LLC, Aug. 22, 2005, pp. 1-214, United States.

IEEE Computer Society, "802.15.3™ IEEE Standard for Information Technology—Telecommunications and Information Exchange Between Systems—Local and Metropolitan Area Networks—Specific Requirements, Part 15.3: Wireless Medium Access Control (MAC) and Physical Layer (PHY) Specifications for High Rate Wireless Personal Area Networks (WPANs)," IEEE, Sep. 29, 2003, pp. i-315, New York, United States.

Multiband OFDM Alliance (MBOA) et al., "Distributed Medium Access Control (MAC) for Wireless Networks Draft 0.99," MBOA Special Interest Group and WiMedia Alliance, Inc., Nov. 1, 2005, pp. i-176, United States.

ECMA International, "High Rate Ultra Wideband PHY and MAC Standard," Standard ECMA-368, 1st Edition, ECMA International, Dec. 2005, pp. i-312, Geneva, Switzerland.

International Search Report dated Apr. 28, 2008 for International Application No. PCT/KR2008/000326, filed Jan. 18, 2008, pp. 1-2, Seo-gu, Daejeon, Republic of Korea.

Shih, E. et al., "Wake on Wireless: An Event Driven Energy Saving Strategy for Battery Operated Devices," Proceedings of the 8th Annual International Conference on Mobile Computing and Netwoking (MobiCom '02), Sep. 23-26, 2002, ACM, 2002, pp. 1-12, New York, United States.

Notification of Transmittal of the International Search Authority, International Search Report and Written Opinion dated May 6, 2008 for International Application No. PCT/KR2008/000319, filed Jan. 18, 2008, pp. 1-10, Seo-gu, Daejeon, Republic of Korea.

Notification of Transmittal of the International Search Authority, International Search Report and Written Opinion dated Apr. 29, 2008 for International Application No. PCT/KR2008/000317, filed Jan. 18, 2008, pp. 1-10, Seo-gu, Daejeon, Republic of Korea.

U.S. Non-Final Office Action for U.S. Appl. No. 12/014,663 mailed Dec. 21, 2010.

U.S. Final Office Action for U.S. Appl. No. 12/014,663 mailed Jun. 21, 2011.

U.S. Non-final Office Action for U.S. Appl. No. 12/014,709 mailed Dec. 21, 2010.

U.S. Non-final Office Action for U.S. Appl. No. 12/014,709 mailed Jun. 9, 2011.

Cidon, I. et al., "Fast Connection Establishment in High Speed Networks," Proceedings of the ACM Symposium on Communication Architectures & Protocols (SIGCOMM '90), 1990, pp. 287-296, ACM, United States.

Crutcher, L.A. et al., "Connection Management for an ATM Network," IEEE Network, Nov. 1992, p. 42, vol. 6, No. 6: Abstract, IEEE, United States.

Clark, D.D. et al., "An Analysis of TCP Processing Overhead," IEEE Communications Magazine, Jun. 1989, pp. 23-29, vol. 27, No. 6, IEEE, United States.

Lindgren, P. et al., "Fast Connection Establishment in the DTM Gigabit Network," Proceedings of the IFIP TC6/WG6.4 Fifth International Conference on High Performance Networking V, 1994, pp. 283-294, North-Holland Publishing Company Amsterdam, The Netherlands.

Korean Non-Final Office Action dated Mar. 8, 2010 for Korean Patent Application No. 10-2008-7009721 filed on Apr. 23, 2008, pp. 1-5, Korean Intellectual Property Office, Seo-gu, Daejeon, Republic of Korea (English translation attached, pp. 1-4).

Korean Final Office Action dated Aug. 31, 2010 for Korean Patent Application No. 10-2008-7009721 filed on Apr. 23, 2008, pp. 1-2, Korean Intellectual Property Office, Seo-gu, Daejeon, Republic of Korea (English translation attached, p. 1).

Korean Non-Final Office Action dated Sep. 17, 2009 for Korean Patent Application No. 10-2008-7008114 filed on Apr. 3, 2008, pp. 1-3, Korean Intellectual Property Office, Seo-gu, Daejeon, Republic of Korea (English translation attached, pp. 1-2).

Korean Final Office Action dated Nov. 20, 2009 for Korean Patent Application No. 10-2008-7008114 filed on Apr. 3, 2008, pp. 1-2, Korean Intellectual Property Office, Seo-gu, Daejeon, Republic of Korea (English translation attached, p. 1).

U.S. Non-Final Office Action for U.S. Appl. No. 12/014,663 mailed Oct. 17, 2011.

* cited by examiner

Data Channel

Control Channel

METHOD AND SYSTEM FOR DEVICE DISCOVERY IN WIRELESS COMMUNICATION

RELATED APPLICATION

This application claims priority from U.S. Provisional Patent Application Ser. No. 60/881,441, filed on Jan. 19, 2007, incorporated herein by reference.

FIELD OF THE INVENTION

The present invention relates to wireless communication, and in particular to channels for wireless communication.

BACKGROUND OF THE INVENTION

Many communication systems implement infrastructure mode wireless networking for communication via central connection points (access points) for wireless local area network (WLAN) clients. An access point forwards data for the wireless clients, enabling the wireless clients to communicate with each other through the access point.

In some applications of infrastructure mode wireless networking, a wireless access point that functions as a coordinator uses an in-band control channel, and stores the information of all wireless client devices associated to it. In this case a device can transmit an information request to the coordinator to obtain the information of other devices within the wireless network.

Such infrastructure mode assumes all devices can periodically receive beacons from the wireless coordinator, indicting channel occupation. However, one or more devices may be located outside the transmission coverage range of the coordinator. For example, if wireless device X wishes to discover wireless device Y, but one or both of the two devices are not within reach of the wireless coordinator, then the discovery mechanism fails.

BRIEF SUMMARY OF THE INVENTION

The present invention provides a method and a system for device discovery in wireless communication. One embodiment involves scanning one or more wireless channels to discover a partner wireless station for a new transmission, by detecting peak energy and beacons on each scanned channel. If a beacon is not detected, then the clearest channel is selected among the scanned channels, and then beacons are transmitted on the clearest channel by the discovering station. Upon detecting a beacon from a partner station, association is established with the partner station and a wireless data channel is selected for communication with the partner station.

Detecting a beacon may further include detecting a response to said beacons sent on the clearest channel, and if a response is not detected, then selecting a next clearest channel and transmitting out beacons on the next clearest channel.

After device discovery and association, data channel selection and bandwidth reservation on the data channel for ad-hoc mode communication may be performed.

Another embodiment involves discovering a partner wireless station to establish a data channel for communication with a discovering station that is associated with a coordinator station, and transmitting a bandwidth reservation request to the coordinator to reserve channel time for control message exchange between the discovering station and the partner station. The discovering station may transmit beacons that include channel reservation information from the coordinator, and detect a response from a partner station.

If the reservation request is denied, then the discovering station disassociates from the coordinator station and transmits a new channel recommendation to the partner station. Upon detecting a new channel confirmation from the partner station, the discovering station transmits beacons to the partner station on the new channel to establish a data channel between the discovering station and the partner station.

These and other features, aspects and advantages of the present invention will become understood with reference to the following description, appended claims and accompanying figures.

BRIEF DESCRIPTION OF THE DRAWINGS

In the drawings, like references refer to similar elements.

DETAILED DESCRIPTION OF THE INVENTION

The present invention provides a method and a system for wireless communication using a control channel to facilitate communication between wireless stations on a data channel.

One embodiment involves using a wireless control channel for control message exchange, to facilitate information communication on a wireless data channel between a pair of wireless stations. The data channel may also be used as a control channel. For example, when a pair of wireless stations wish to establish an ad-hoc wireless communication link for a new transmission, without association to a coordinator, signaling on the data channel may be utilized for facilitating establishment of such a link. As such, control messages such as beacons are transmitted at the same wireless frequency band as the new transmission between the pair of stations.

To establish a data channel for a new transmission between a pair of wireless stations, the two stations first discover each other and find a free data channel, or a data channel with sufficient free bandwidth, to support the new transmission. In order to avoid interference with ongoing network operations and transmissions caused by hidden terminals, a device discovery process is conducted as follows.

Device Discovery

A discovering station (e.g., initiator) is powered on or wakes up from standby mode. The station scans all channels including control channels (e.g., omni-directional channels), and optionally data channels (e.g., directional/beamforming channels). Specifically, for each scanned channel, the discovering station continues to scan the channel for a specified scanning period (mTimeoutBeaconScan), to detect peak energy and analyze any beacons or frames on the scanned channels.

If during the scanning period the discovering station receives a beacon or frame from a partner station (e.g., responder), then the discovering station transmits a reply to that partner station, which if received by the partner station, results in successful device discovery.

However, if during the scanning period the discovering station cannot receive beacons or frames from other stations, then the discovering station selects the clearest channel according to scanning results (if there are one or more channels on which the discovering station cannot receive beacons or frames, the clearest channel is the one without any beacon or frames, and minimal peak energy). The discovering station then begins randomly transmitting its own beacons on the selected channel during a maximum interval between beacons (mMaxBeaconIntervalTime). Such beacons contain station description information for device discovery purposes. If the discovering station knows the station information of its partner station (responder) to establish a new data transmission with, then the beacons transmitted by the discovering station include information for the partner station.

The discovering station then scans all channels to detect a responsive beacon or frame from its partner station. If during a reply period (mMaxReplyingBeacon) the discovering station receives a responsive beacon or frame from the partner station (responder), then the discovering station transmits a reply to the partner station, which if received by the partner station, results in a successful device discovery.

However, if the discovering station does not receive a responsive beacon or frame from the partner station during the reply period, and if the discovering station is the initiator of the ad-hoc transmission, then the discovering station selects/switches to the next clearest channel, and randomly transmits beacons again to receive a responsive beacon or frame from its partner station and the above process is repeated until successful device discovery or optionally a time out.

Association and Bandwidth Reservation

After a successful device discovery process between the two stations, data channel selection and bandwidth reservation processes are performed. Association allows selection of a data communication channel for information transmission between the two stations. During an association process the two stations exchange capability information for selecting a data channel. The two stations may exchange control messages or beacons that include capability information. The two stations then check such capability information to determine if they can appropriately communicate over a data channel, and then select a data channel for bandwidth reservation thereon.

During a bandwidth reservation process, in general, a reservation scheme may be applied to a channel (out-of-band channel and/or in-band channel) based on a superframe structure including superframes separated by beacons. In each superframe there are contention periods and contention-free periods. The beacons provide information about scheduled channel time blocks in a contention-free period (CFP). Further, a bandwidth reservation scheme is applied based on the superframe structure, wherein beacons divide the channel time into multiple superframes. In each CFP there are one or more schedules, and each schedule includes one or more reserved channel time blocks for transmission. The schedules represent reserved channel time blocks, and the time periods between the schedules are unreserved channel time blocks. The length of each reserved channel time block is defined in a schedule for a pair of stations. In one example, a beacon can include bandwidth allocation information elements (IE), indicating channel occupation information (e.g., a certain duration of a channel time block is reserved for communication).

Transmission beacons can be placed anywhere in a beacon period, (e.g., mMaxBeaconIntervalTime period) providing flexibility for point-to-point ad-hoc transmissions with an out-of-band channel for control messages.

An example implementation for a 60 GHz frequency band wireless network is now described. Such implementation is useful with Wireless HD (WiHD) applications. Wireless HD is an industry-led effort to define a wireless digital network interface specification for wireless HD digital signal transmission on the 60 GHz frequency band, e.g., for consumer electronics (CE) and other electronic products. An example WiHD network utilizes a 60 GHz-band mmWave technology to support a physical (PHY) layer data transmission rate of multi-Gbps (gigabits per second), and can be used for transmitting uncompressed high definition television (HDTV) signals wirelessly. The present invention is useful with other wireless communication systems as well.

Figure 1:
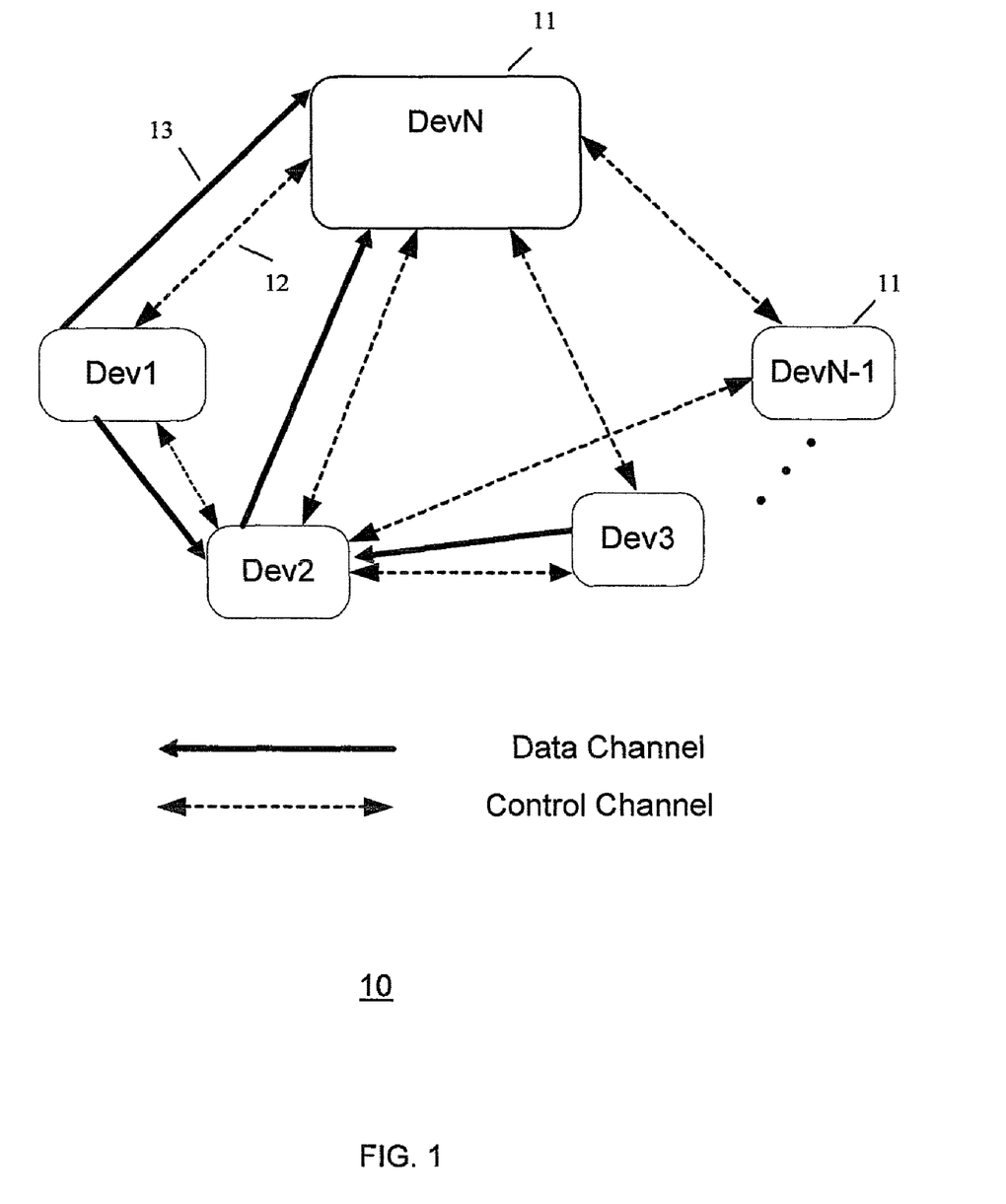
FIG. 1 shows a block diagram of a wireless network implementing wireless communication, according to an embodiment of the present invention.

FIG. 1 shows a functional block diagram of a wireless network 10 that implements ad-hoc wireless communication between N wireless stations 11 (e.g., devices Dev1, . . . , DevN) on a 60 GHz frequency band using Frequency Division Duplex (FDD) channel access, according to an embodiment of the present invention. A low-rate (LR) omni-direction channel 12 (e.g., 2 GHz to 5 GHz) may be used for control message transmissions. Transmission beacons can be placed anywhere in a beacon period providing flexibility for point-to-point ad-hoc transmissions on a directional high-rate (HR) channel, such as a 60 GHz data channel 13.

At higher frequency bands such as 60 GHz (high-rate channel) there is much more free space loss than at lower frequencies such as 2 GHz or 5 GHz (low-rate channel) because free space loss increases quadratically with frequency increases. This higher free space loss can be compensated for using multiple antennas with more pattern directivity, while maintaining small antenna dimensions, known as beamforming. When beamforming is used, antenna obstruction (e.g., by an object) and mis-pointing, may easily cause a substantial drop in received transmission power. This may nullify the advantage of using multiple antennas. Therefore, dynamic beamsearching and beamtracking are used to maintain stable beamforming transmission. Beamtracking involves monitoring the quality of beamformed transmission on a beamforming channel, while beamsearching involves searching for new beamforming coefficients to provide satisfactory channel quality. At higher frequencies such as 60 GHz transmissions, directional antennas can be used, wherein one or more directional antennas at a sender can physically point to a receiver to compensate for higher free space loss. Usually there is no dynamic beamsearching when directional antennas are used.

In the example network 10 shown in FIG. 1 according to the present invention, the stations 11 operate in ad-hoc transmission mode. A coordinator may also manage the stations within the transmission range of one another, though not required. The omni-directional channel 12 may be used for control message signaling purposes, and a directional in-band data channel 13 (e.g., 60 GHz) is used for data communication. In one example, the channel 12 can use different technologies such as Bluetooth, WLAN, other wireless technologies such as ultra-wide band (UWB), or even another different 60 GHz channel (e.g., same bandwidth or narrower than channel 13). The channel 12 is a symmetric channel and supports a half-duplex mode. The channel 12 has the same coverage range as the data channel 13. The data channel 13 is an asymmetric channel (e.g., 60 GHz data transmission is for one-way transmission only). Further, the channel 12 can serve as a default channel for control messages for all of the stations. Multiple transmissions can share the same data channel simultaneously by using the directional transmission to avoid interference.

Data channel selection (e.g., determining which 60 GHz data channel to use) for data communication between two stations is determined between the two stations by signaling on a low-rate channel or a high-rate channel. Then bandwidth reservation on the selected data channel is performed by transmitting a bandwidth reservation request message and obtaining a bandwidth reservation response indicating if the bandwidth is reserved.

Figure 2:
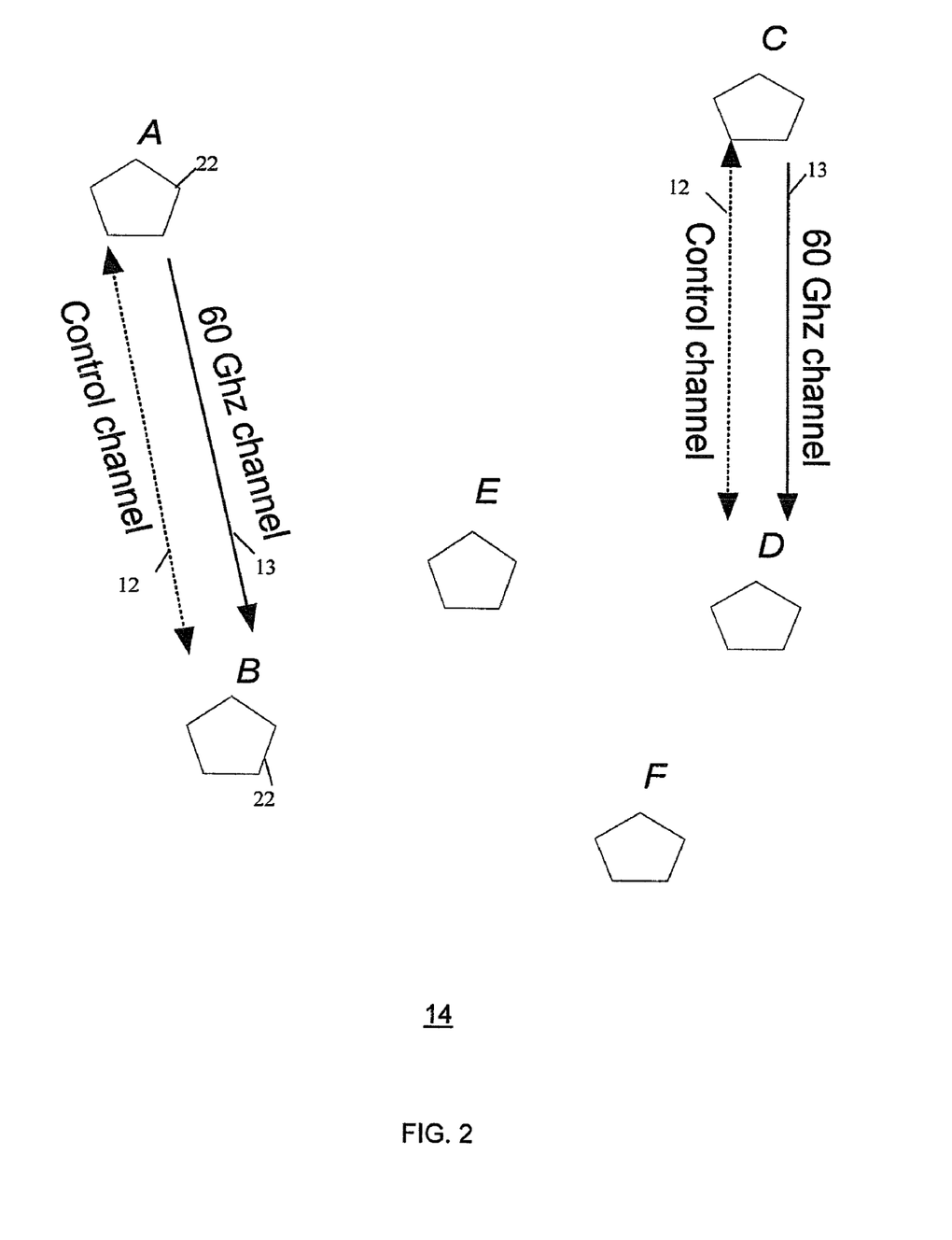
FIG. 2 shows an example configuration for ad-hoc wireless communication, according to the present invention.

FIG. 2 shows an example communication configuration in a network 14 including wireless stations 22 (e.g., stations A-F), wherein wireless stations 22 may use a control channel 12 and a data channel 13 such as a 60 GHz channel. The control channel 12 can be an out-of-band channel and the data channel 13 can be an in-band channel. An out-of-band channel is a first physical channel that is out-of-band relative to a second physical channel (i.e., an in-band channel). The out-of-band channel is at a frequency different from an in-band channel. For example, an in-band data transmission channel may operate on a 60 GHz frequency band, whereas, an out-of-band channel may operate on a 5 GHz or 2.4 GHz (or even another 60 GHz) frequency band. An out-of-band frequency means a different frequency than an in-band frequency, even if both are in the same frequency band.

In this example, stations A and B are involved in establishing a data channel for data communication therebetween, and stations C and D are involved in an ongoing communication on a data channel therebetween. If directional data transmission from station A to station B does not interfere with ongoing directional data transmission from station C to station D, then stations A and B can simultaneously use the same data channel as stations C and D for directional data transmission.

Figure 3:
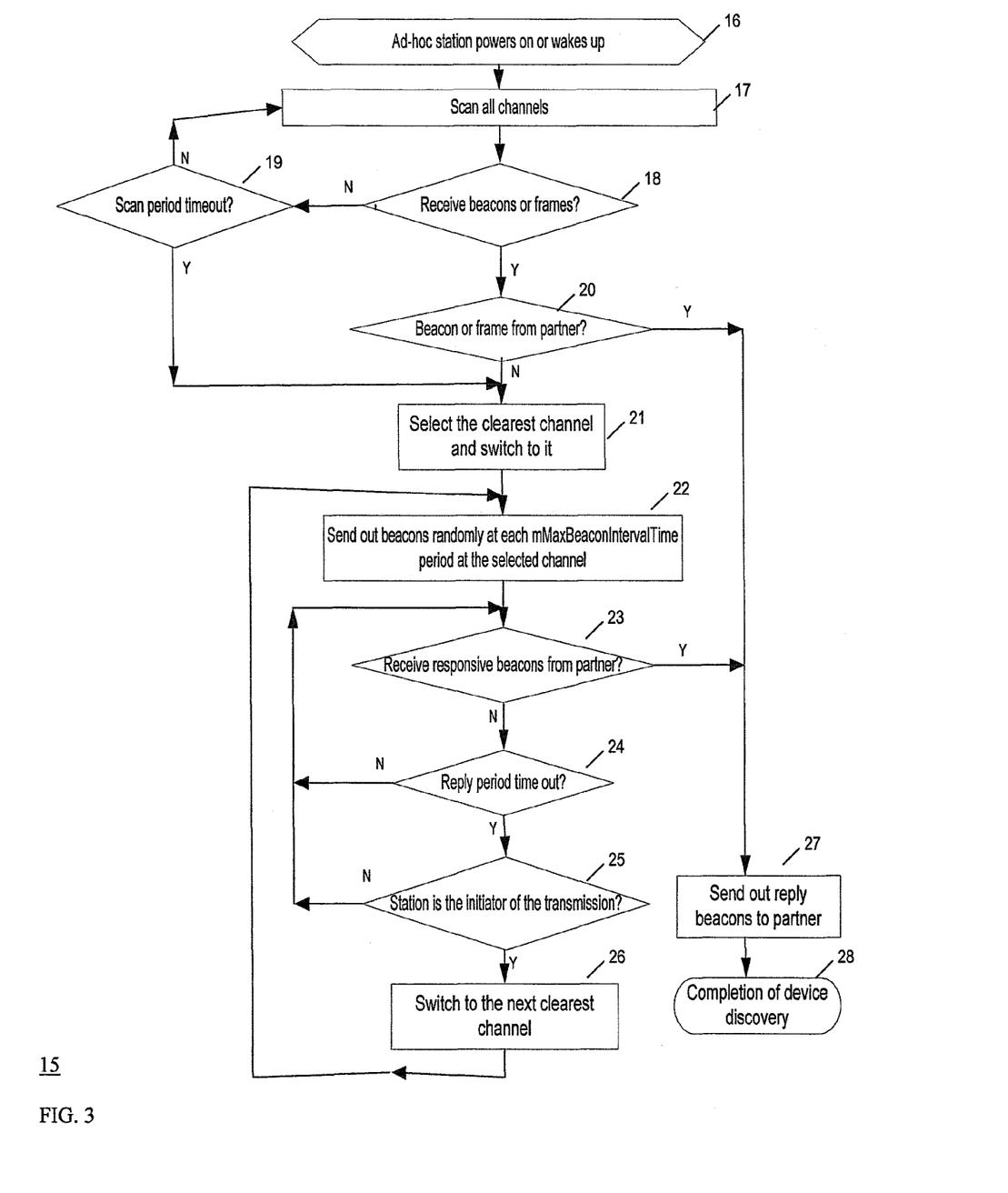
FIG. 3 shows an example flowchart of a device discovery for wireless communication, according to the present invention.

To establish such a data communication channel, stations A and B first conduct device discovery, and then perform association and reservation. FIG. 3 shows an example device discovery process 15 for establishing an ad-hoc wireless link for data communication between two wireless stations, such as stations A and B, according to the present invention, including the steps of:

Step 16: A discovering station (e.g., station A in FIG. 2) is powered on or wakes up from standby mode.

Step 17: The discovering station scans all channels including control channels (e.g., omni-directional channels), and optionally data channels (e.g., directional/beamforming channels). The discovering station detects peak energy and analyzes any received beacons and other frames on those channels.

Step 18: The discovery station determines if any beacons or frames are received on the scanned channels. If not, the process proceeds to step 19, otherwise the process proceeds to step 20.

Step 19: The station determines if the scanning period (mTimeoutBeaconScan) has expired? If not, the process proceeds back to step 17 for further scanning, otherwise the process proceeds to step 21.

Step 20: The discovering station determines if a received beacon or frame is from a partner station (e.g., station B in FIG. 2)? If yes, the process proceeds to step 27.

Step 21: Since the discovering station has not received beacons or other frames from a partner station, then the discovering station selects the clearest channel according to the scanning results.

Step 22: The discovering station begins randomly transmitting its own beacons on the selected channel during a mMaxBeaconIntervalTime period. These beacons include discovering station description information, and partner station information, if known to the discovering station. Channel scheduling information may also be included in the beacons.

Step 23: The discovering station then scans all channels to detect a responsive beacon or frame from its partner station. If during a reply period (mMaxReplyingBeacon) the discovering station receives a responsive beacon or frame from a partner station (responder), then the process proceeds to step 27.

Step 24: The discovering station determines if the reply period has expired. If yes, the process proceeds to step 25, otherwise, the process proceeds back to step 23 for further scanning.

Step 25: The discovering station determines if it is the initiator of a desired transmission with the partner station. If yes, the process proceeds to step 26, otherwise, the process proceeds back to step 23 for further scanning.

Step 26: The discovering station selects/switches to the next clearest channel, and the process proceeds back to step 22 for randomly transmitting out beacons again to receive a responsive beacon or frame from a partner station.

Step 27: Having received a beacon or frame from the partner station, the discovering station transmits a reply beacon to the partner station.

Step 28: Upon receipt of that reply beacon by the partner station, device discovery successfully concludes.

In the above process, if the discovering station (e.g., Station A in FIG. 2) can receive beacons from one or multiple channels, but the beacons are not sent from the partner station (e.g., Station B), the discovering station selects the clearest channel for transmitting its own beacons. If there are one or more scanned channels on which the discovering station cannot receive beacons or other frames, the discovering station then selects the clearest channel without any beacons or frames and with minimal peak energy, to transmit its own beacons on. However, if the discovering station can receive beacons/frames from all scanned channels, but the received beacons/frames are not from the partner station, the discovering station selects a channel with the largest unreserved channel time and minimal peak energy to transmit its own beacons on.

If the discovering station receives a beacon sent from its partner station, then the discovering station replies with a beacon as soon as possible if the channel on which the partner station's beacon/frame was received from has free time. After the discovering station transmits beacons on a selected channel with the information of its partner station, the discovering station expects to receive a reply beacon from its partner station on that selected channel. However, if the partner station does not operate on the same channel, the partner station cannot reply (feedback) with any beacons. If the discovering station is the initiator of the ad-hoc transmission, then after a mMaxReplyingBeacon timeout, the discovering station selects the clearest channel, and transmits beacons again, as described.

In the above process, if there are at most m 60 GHz channels, it requires that mTimeoutBeaconScan>a×m×mMaxBeaconIntervalTime, where a is an integer greater than 2.

When WiHD infrastructure mode network and other ad-hoc transmissions coexist, the above discovery process can be applied in at least all of the following cases:

(a) Both the initiator and the responder stations (e.g., stations A and B) are within the range of a Wireless Video Area Networking (WVAN) coordinator station.

(b) The initiator is within the range of a WVAN coordinator station but the responder is not.

(c) The responder is within the range of a WVAN coordinator station but the initiator is not.

(d) Both the initiator and responder are outside the range of a WVAN coordinator.

It is preferable to reduce the probability that different ad-hoc station pairs share the same data channel, as long as there are other free channels. Further, it is preferable to reduce the probability that ad-hoc station pairs share the same channel with stations in infrastructure mode, as long as there are other free channels.

With more assumptions, the above process can be simplified, and the total device discovery delay can be reduced. In one example, it is assumed that ad-hoc links should be tried at a default channel first. Then, when a station is powered on, instead of scanning all channels, the station will switch to the default channel to perform device discovery. However, the assumption of a default channel may cause more collisions when many station pairs attempt to use the default channel simultaneously. In another example, it is assumed that all ad-hoc transmissions are conducted between two stations which are close to each other (e.g., the distance of an ad-hoc transmission is less than 1 meter compared to 10 meters of a WVAN network range), such most likely the two stations will choose the same clearest channel and discover one another easily.

Figure 4:
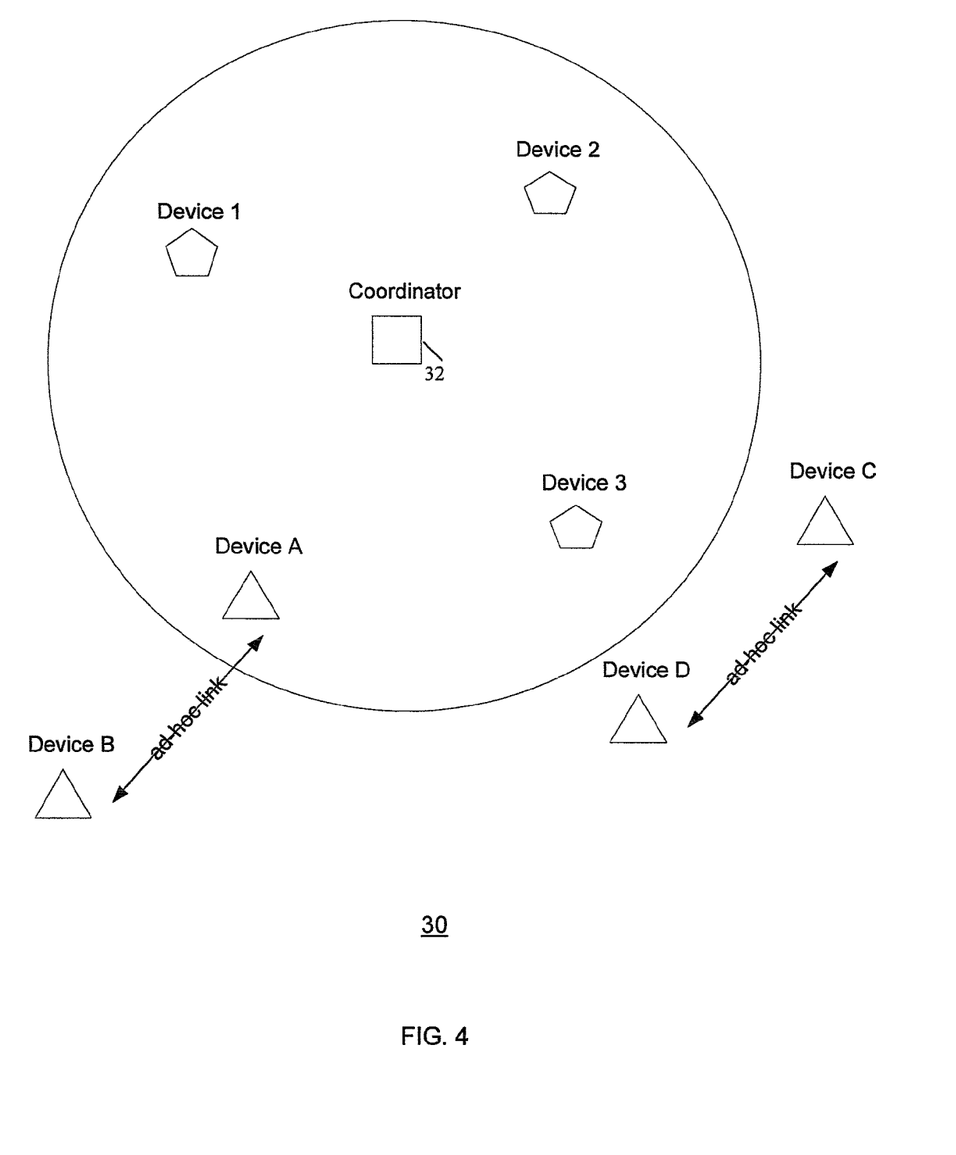
FIG. 4 shows an example configuration for wireless communication by wireless stations in a wireless network with hybrid infrastructure and ad-hoc structure, according to the present invention.

The present invention provides device discovery and channel selection for stations in hybrid mode. In-band signaling is utilized, wherein the low-rate control messages such as beacons are transmitted at the same frequency band with high-rate data transmissions. The hybrid mode transmission involves a pair of stations, wherein one station is already associated to a coordinator but the other station is outside the coverage range of the coordinator. For example in a wireless network 30 shown in FIG. 4, a wireless station Device 3 is already associated to the coordinator 32, and a portable wireless station Device C (partner) wishes to transmit data to Device 3. As such, the Device C and Device 3 engage in device discovery to find a free channel, or a channel with sufficient free bandwidth, to support the transmission.

Figure 5:
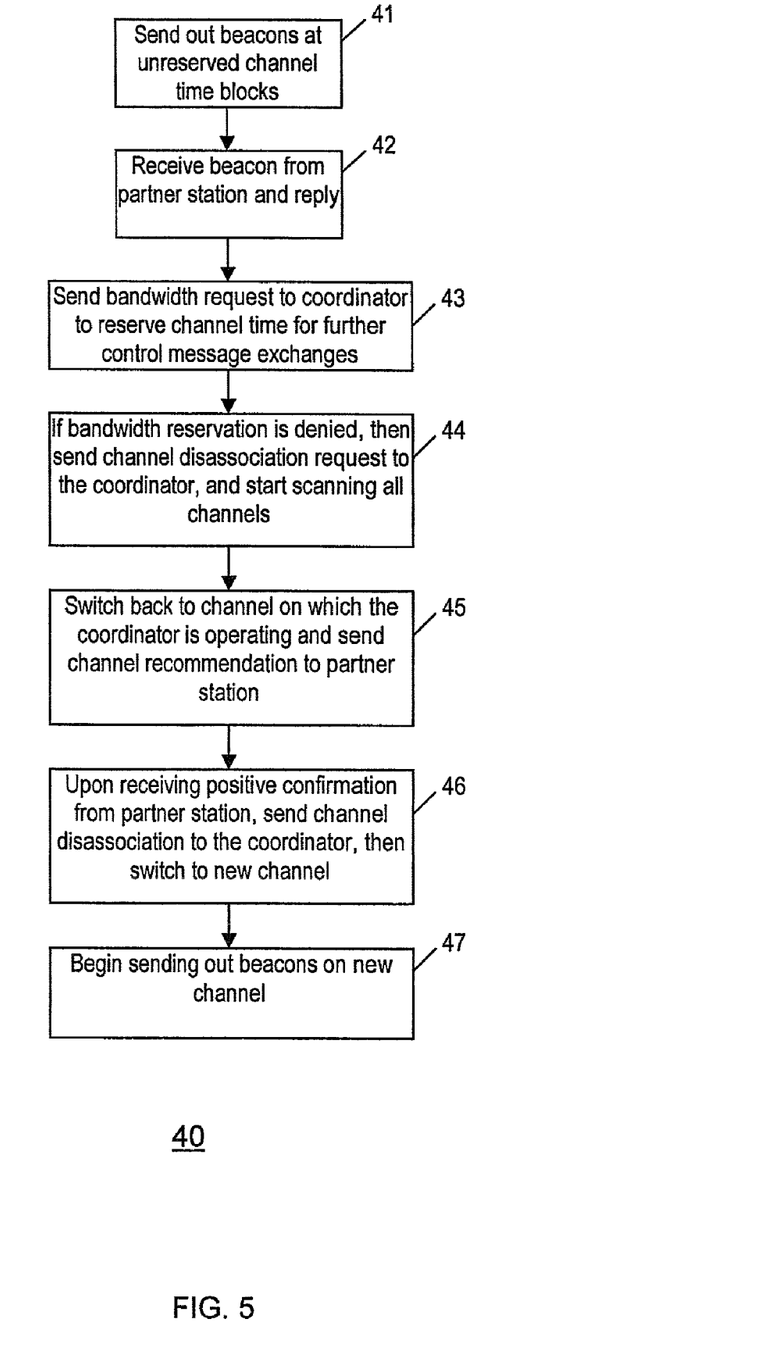
FIG. 5 shows an example flowchart of a device discovery process for wireless communication, according to the present invention.

As a variation on the device discovery process described in relation to FIG. 3 above, in hybrid mode a discovering station which is already associated to a coordinator will not scan other channels during device discovery stage (e.g., Device 3 station will not scan other channels during device discovery stage). Instead, such a station remains at the existing channel and its beacon includes channel reservation schedule information of the coordinator's beacon, and infrastructure mode information. The beacons from the station are sent out randomly within unreserved channel time blocks. Referring to the flowchart in FIG. 5, an example device discovery and channel selection process 40 for a discovering station already associated to a coordinator involves the following steps:

Step 41: The associated station starts to transmit beacons randomly at unreserved channel time blocks for device discovery. Each beacon includes the schedule information of a coordinator beacon and an infrastructure mode indication.

Step 42: After the associated station receives a beacon from its partner station, the associated station replies with a beacon to notify the success of the device discovery.

Step 43: The associated station transmits a bandwidth request command to the coordinator to reserve channel time blocks for further control message exchanges between the associated station and the partner station. The reserved channel time blocks are used for bandwidth reservation signaling and channel re-selection if the current channel has insufficient channel time for the new stream (i.e., new transmission).

Step 44: If the current channel has insufficient channel time for the new stream (i.e., the reservation request is denied), the associated station transmits a channel disassociation request to the coordinator and starts to scan all channels. If a station has been already associated with another station (including a coordinator) on one channel, it is difficult for the station to scan other channels. Therefore, in order to scan other channels, the station performs disassociation first. Scanning channels is used to find beacons or other signals on different channels.

Step 45: After channel scanning, the associated station switches back to the channel on which the coordinator is operating, and transmits a channel recommendation to its partner station.

Step 46: After receiving a positive confirmation from its partner station, the associated station transmits a channel disassociation request to the coordinator, and switches to a new channel. Disassociation is necessary before leaving a current channel and joining another channel.

Step 47: After switching to the new channel, the disassociated station begins transmitting beacons on the new channel. As such, the station starts to operate on the new channel by sending out beacons.

Figure 6:
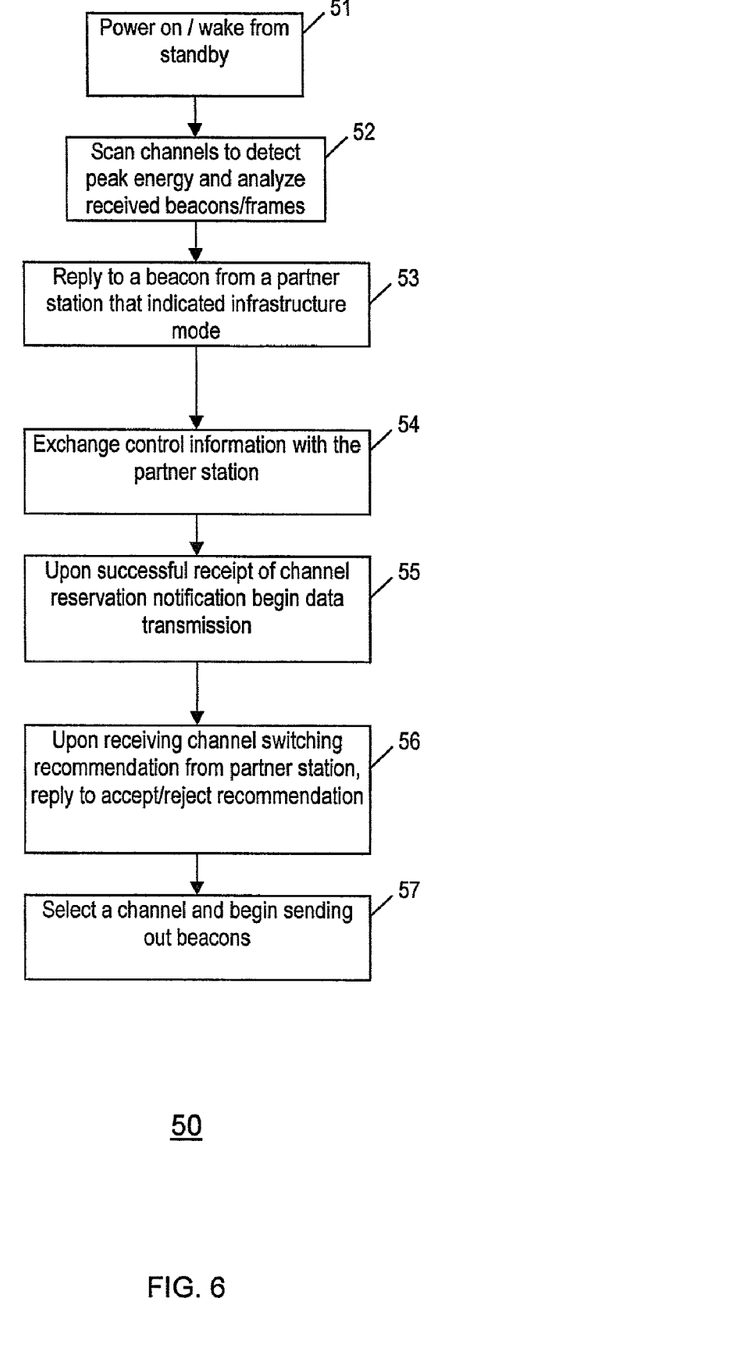
FIG. 6 shows an example flowchart of another device discovery process for wireless communication, according to the present invention.

Referring to FIG. 6, a device discovery process 50 for a discovering station which is outside the coverage of the coordinator includes the following steps:

Step 51: The discovering station is powered on or wakes up from a standby mode.

Step 52: The discovering station scans all channels (at least all low-rate omni-direction control channels and optionally high-rate beamforming channels). For each channel, the station continues to scan the channel for at least mMaxBeaconIntervalTime, to detect the peak energy and analyze beacons and other frames that may be received on each scanned channel.

Step 53: When the discovering station receives a beacon/frame sent from a partner station on a current channel, and the beacon indicates the infrastructure mode, the discovering station replies with a beacon as soon as possible if the channel has free time. If the partner station receives that responsive beacon, the two stations have successfully discovered each other.

Step 54: The discovering station exchanges control messages with the partner station during reserved channel time blocks on the current channel.

Step 55: If the discovering station receives successful channel reservation notification, the discovering station conducts data transmission at reserved channel time blocks on the current channel.

Step 56: If the discovering station receives channel switching recommendation from the partner station, the discovering station checks its channel scanning results and replies to accept or reject the recommendation.

Step 57: After deciding on a channel the two stations switch to that channel and start transmitting beacons.

It is preferable to keep the new transmission on the current channel for the hybrid mode, if there is enough bandwidth, since one station in the pair of stations is already associated to a coordinator.

In one scenario, the two stations analyze the beacons to obtain data channel occupation information on each 60 GHz data channel. Then the transmission responder (partner station) transmits a channel occupation information notification frame to the transmission initiator to report the 60 GHz data channel occupation information that the responder obtained from the received beacons. Then, the initiator combines the channel occupation information that it has obtained from the responder, to determine which 60 GHz data channel can be used for the ad-hoc transmission. The transmission initiator selects a free 60 GHz channel, if such a channel exists, for the new ad-hoc transmission. If no free 60 GHz channel is available, the two stations will wait until such a channel becomes available.

A further variation for station association and capability exchange is now described. A station can operate in ad-hoc mode, as explained above, or in managed mode. Examples of managed mode include an access point (AP) in a wireless local area network (WLAN), a coordinator in UWB, and a Master device in Bluetooth. Before a station can start transmitting on a data channel (e.g., an in-band high-rate 60 GHz physical layer channel), the station performs association on a control channel (e.g., an out-of-band channel). Association on a data channel is performed after the stations are successfully associated on the control channel. An example implementation, wherein an out-of-band control channel is used for communication of control messages and beacons, to facilitate establishing a link on an in-band data channel is described below.

Figure 7:
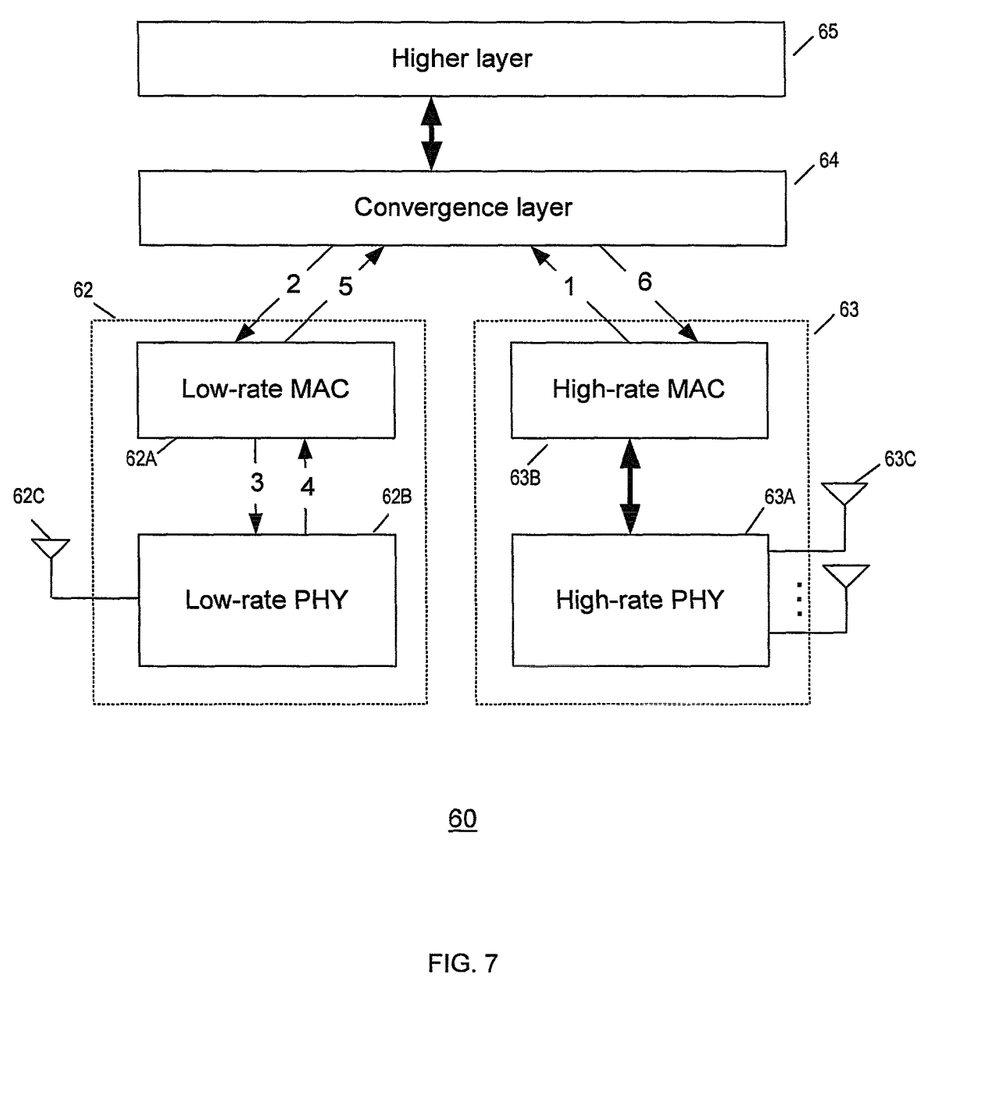
FIG. 7 shows an example architecture for wireless communication by a wireless station in a wireless network, according to the present invention.

FIG. 7 shows an example block diagram of a wireless station (e.g., a station 11 in FIG. 1 or a station 22 in FIG. 2). The station 60 includes an out-of-band communication module 62 (e.g., low-rate wireless transceiver) and an in-band communication module 63 (e.g., high-rate wireless transceiver). The communication module 63 (data communication module) is used for data communication via an in-band channel 13 (FIG. 2). The communication module 62 (control communication module) is used for communication of control messages via an out-of-band channel 12 (FIG. 2) for device discovery and association processes, although the communication module 63 can be used instead of, or in addition to, the communication module 62 for transmission of control data, as noted above in device discovery and association processes.

The station 60 can function as an initiator or a responder, wherein a transmission initiator is a station that first initiates transmission and can be a transmission sender or receiver. A transmission responder is a station that responds to the transmission initiator and can be a transmission sender or receiver. A frame structure is used for data transmission between wireless stations. The communication protocol can be an infrastructure mode or an ad-hoc mode communication protocol.

For example, frame aggregation can be used in a Media Access Control (MAC) layer and a PHY layer. The MAC layer obtains a MAC Service Data Unit (MSDU) and attaches a MAC header thereto, in order to construct a MAC Protocol Data Unit (MPDU), for transmission. The MAC header includes information such as a source address (SA) and a destination address (DA). The MPDU is a part of a PHY Service Data Unit (PSDU) and is transferred to a PHY layer in the transmitter to attach a PHY header (i.e., PHY preamble) thereto to construct a PHY Protocol Data Unit (PPDU). The PHY header includes parameters for determining a transmission scheme including a coding/modulation scheme. Before transmission as a packet from a transmitter to a receiver, a preamble is attached to the PPDU, wherein the preamble can include channel estimation and synchronization information.

The communication module 62 provides a MAC/PHY path for control message communication over an out-of-band channel, and the communication module 63 provides a MAC/PHY path for the data communication over an in-band channel 13. In one example, the communication module 62 implements out-of-band communication for control transmission via an antenna 62C on an out-of-band channel. The communication module 63 implements an in-band communication for transmission of information (e.g., data, video, audio) via the antennas 63C on an in-band channel. The out-of-band channel is used for device discovery and association between two stations, which allows selection of an in-band communication channel for information transmission between two stations (e.g., stations A and B in FIG. 2). The in-band communication channel can also be used for device discovery and association, as discussed. The MAC/PHY path in each of the communication modules 62 and 63 can be configured to perform any one of the device discovery, association and bandwidth reservation processes, described herein.

In one implementation, a convergence layer module 64 for the wireless station 60 implements a process using the communication module 62 for scanning an out-of-band channel 12, to discover another wireless station, communicating capability information with a discovered station to establish association, and communicating channel occupation information with the discovered station. The convergence module 64 can be configured such that, in conjunction with the MAC/PHY path in each of the communication modules 62 and 63, the convergence module 64 performs the device discovery, association and bandwidth reservation processes, described herein.

Thereafter, the convergence module 64 provides selection of an in-band communication channel 13 based on the occupation information for information communication with the discovered station via the communication module 63 on the in-band channel. The information communication may include ad-hoc mode communication over the in-band wireless channel.

As noted, the communication module 63 comprises a high-rate (HR) module including a HR MAC/PHY path for the in-band data channel 13 (e.g., a 60 GHz frequency band). Further, the communication module 62 comprises a low-rate (LR) module including a LR MAC/PHY path for the out-of-band channel 12 (e.g., Bluetooth, UWB or WLAN, or a different 60 GHz band as used in the HR path). Specifically, the communication module 62 comprises a LR MAC layer 62A and a LR PHY layer 62B, and supports omni-directional wireless communication over the out-of-band channel 12. The communication module 63 comprises a HR MAC layer 63A and a HR PHY layer 63B, and supports directional (or beamformed/steered) wireless communication on the in-band channel 13.

The convergence module 64 interfaces with an application/user control layer 65, and coordinates and synchronizes the communication modules 62 and 63 by messaging. The convergence module 64 provides overlay connection control and management for various channels (e.g., both LR and HR channels), by communication of control/management information via the out-of-band control channel 12. In one example, the convergence module 64 coordinates communications through a 60 GHz in-band frequency via the communication module 63 and through a 2.4 GHz, 5 GHz or a different 60 GHz frequency out-of-band channel via the communication module 62. The convergence module 64 further provides information adaptation for communication via the in-band channel 13. In one example, this provides video stream/data adaptation for communication via the in-band channel, wherein such adaptation includes pixel partitioning, aggregation/acknowledgment, fast format/link adaptation, transmission power control, etc.

As noted, the LR PHY/MAC layer implemented by the communication module 62 is mainly used for control message exchange between stations on the out-of-band channel 12. An example is when initially a first station 60 powers on or resumes operation, wherein the convergence layer 64 uses the communication module 62 to communicate control messages on the out-of-band channel to discover and associate with other stations 60. Upon successful discovery and association, an in-band channel is established by bandwidth reservation for communication (e.g., ad-hoc mode) on the selected in-band channel between the first station and another station via the HR PHY/MAC layer of the communication module 63. In addition, when the in-band channel is established, control messages may be transmitted on the out-of-band channel for facilitating communication on the in-band channel by the two stations.

Association on the data channel is performed after the stations are successfully associated on the control channel. The steps involved in the association process are shown in FIG. 7, and include:

1. The high-rate MAC 63B sends an association request message to the convergence layer 64.
2. The convergence layer 64 sends the message to the low-rate MAC 62A.
3. The low-rate MAC 62A treats the high-rate association message as data and sends it to the low-rate PHY 62B. After these steps, a centralized controller, such as a coordinator or AP 32 in FIG. 4, receives the Association Request message. The centralized controller is also a wireless station that includes similar modules as station 60. Upon receiving the association request message, the centralized controller provides the message to its convergence module, which eventually provides the message to the high-rate MAC of the controller 32. The high-rate MAC at the controller 32 processes the message and sends an Association Response message to the station seeking association.
4. The Association Response message is received by station 60.
5. The low-rate MAC 62A sends the message to the convergence module 64.
6. The convergence module 64 sends the message to the high-rate MAC 63B.

Not all of the stations are required to have both LR and HR communication capability, but all stations have LR communication capability. Though in the example in FIG. 7 a default LR control channel can be used for all HR (i.e., 60 GHz in-band) capable stations, such is not required. If there are multiple LR control channels which can be used by 60 GHz capable stations, the channel selection and reservation process can be varied to account for multiple LR control channels. For example, when two ECMA-60 GHz stations (according to the ECMA international organization) wish to establish a 60 GHz in-band data channel, both stations search for convergence layer beacons at all LR channels to collect 60 GHz channel allocation information (control messages can be placed in convergence layer beacons or other control message formats, and transmitted by the communication module 62 of the involved stations on the out-of-band channel. The involved station then checks 60 GHz capability information from such beacons to determine if they can appropriately communicate over an in-band channel). This helps reduce the possibility of 60 GHz channel interference. After searching, if a 60 GHz channel is available for both stations, they can reserve the entire 60 GHz channel through 60 GHz bandwidth reservation signaling at their convergence modules. After reserving a 60 GHz channel, both stations broadcast convergence module beacons at the LR channel when they use a 60 GHz channel.

As such, the present invention provides device discovery, channel selection and channel control schemes to support ad-hoc mode and hybrid mode for 60 Ghz wireless networks. The present invention further provides device discovery and link control to minimize collisions and interference caused by hidden terminals. Referring back to FIG. 4, without application of the present invention, collision and interference can be caused by a hidden terminal as a very severe problem in 60 GHz wireless networks operating on ad-hoc mode or infrastructure/ad-hoc hybrid mode. For example, since Device B is out of range of the coordinator 32 and cannot hear the beacons from the coordinator, Device B (hidden terminal) may transmit frames at the beacon transmission time of the coordinator and other devices associated to the coordinator such as device A, causing collisions. In another example, Device A is transmitting data to Device 3 using beamforming on a channel, and simultaneously Device D is listening to the same channel and since it cannot hear anything from the channel, Device D transmits a beacon in omni-direction mode while attempting to find Device C. The beacon sent out by Device D could interfere with the ongoing beamforming transmission between Device A and Device 3. A device discovery, association and link control process according to the present invention reduces the collisions and interference caused by hidden terminal problems.

Figure 8:
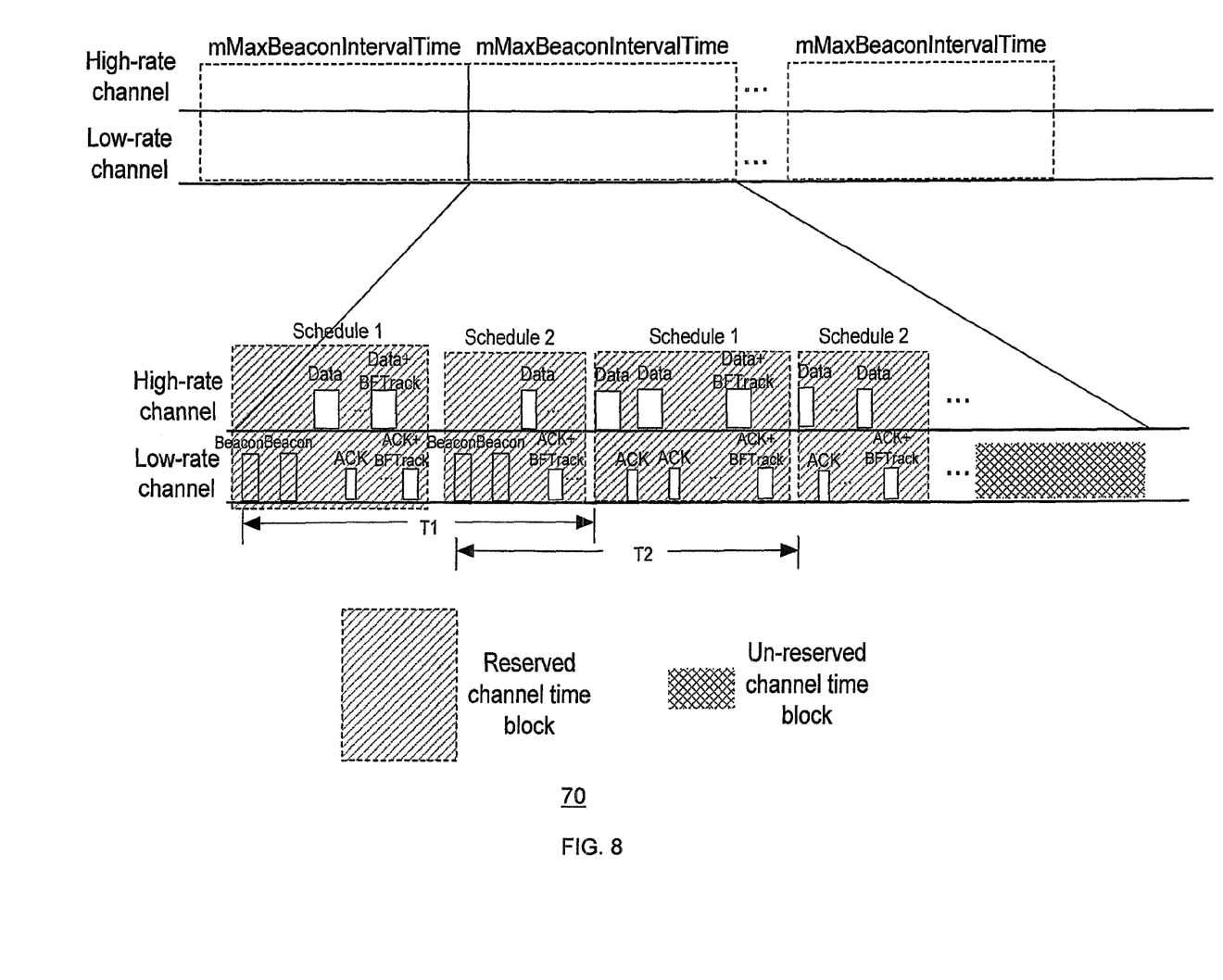
FIG. 8 shows an example channel reservation scheme using superframes and beacons, according to the present invention.

The present invention further reduces interference and collision possibility for ad-hoc mode and hybrid mode communication between adjacent networks. It is useful with cases where the coordinator cannot reach all devices with simple point-to-point ad-hoc mode. The present invention further allows placement of beacons anywhere in a mMaxBeaconIntervalTime period and is more flexible for point-point ad-hoc transmissions, such as shown by example 70 in FIG. 8.

As is known to those skilled in the art, the aforementioned example architectures described above, according to the present invention, can be implemented in many ways, such as program instructions for execution by a processor, as logic circuits, as an application specific integrated circuit, as firmware, etc. For example, the convergence module 64 can be implemented as a software or firmware application, a computer-implemented method, a program product stored on a computer useable medium, for execution on a processor (e.g., CPU, microcontroller) in a wireless station. The present invention has been described in considerable detail with reference to certain preferred versions thereof; however, other versions are possible. Therefore, the spirit and scope of the appended claims should not be limited to the description of the preferred versions contained herein.

What is claimed is:

1. A method of wireless communication, comprising:
performing device discovery by scanning a wireless control channel to discover a wireless partner station for a new transmission comprising:
   (a) scanning one or more wireless channels to discover a wireless partner station by detecting peak energy and beacons on each scanned channel; and
   (b) if a beacon is not detected, then selecting the clearest channel among the scanned channels, and transmitting beacons on the clearest channel; and
upon detecting a beacon from a partner station, establishing association with the partner station and selecting a wireless data channel for communication with the partner station.

2. The method of claim 1, wherein:
the control channel comprises a default control channel;
establishing association with the partner station further includes communicating capability information and channel occupation information with the partner station; and
selecting a wireless data channel further includes selecting a wireless data channel based on the capability information and the channel occupation information.

3. The method of claim 1, wherein step (b) further includes:
detecting a response to said beacons sent on the clearest channel; and
if a response is not detected, then selecting a next clearest channel and transmitting beacons on the next clearest channel.

4. The method of claim 3 further including the step of performing bandwidth reservation on the selected data channel for ad-hoc communication with the partner station.

5. A method of wireless communication, comprising:
a discovering station associated to a coordinator, transmitting beacons randomly within unreserved channel time blocks, and transmitting a bandwidth reservation request to the coordinator to reserve a control channel time for control message exchange between the discovering station and the partner station; and
a partner wireless station outside coverage of the coordinator receiving the beacon and transmitting a response beacon on a control channel, for establishing communication with the discovering station on a wireless data channel.

6. The method of claim 5 further including:
the discovering station transmitting at least one beacon on the control channel including coordinator channel reservation schedule information and infrastructure mode information.

7. The method of claim 6 further including:
if the reservation request is denied, then disassociating the discovering station from the coordinator and transmitting a control channel recommendation to the partner station.

8. The method of claim 7 further including:
upon detecting a recommended control channel confirmation from the partner station, transmitting beacons to the partner station on the recommended control channel to establish a data channel between the discovering station and the partner station.

9. A wireless communication station, comprising:
a communication module configured for performing device discovery by scanning a wireless control channel to discover a wireless partner station for a new transmission comprising: scanning one or more wireless channels to discover a wireless partner station by detecting peak energy and beacons on each scanned channel, and if a beacon is not detected, then selecting the clearest channel among the scanned channels, and transmitting beacons on the clearest channel; and
a convergence module configured such that upon detecting a beacon from a partner station, the convergence module establishes association with the partner station and selecting a wireless data channel for communication with the partner station.

10. The wireless communication station of claim 9, wherein:
the control channel comprises a default control channel; and
the convergence module is further configured for communicating capability information and channel occupation information with the partner station, and selecting a wireless data channel based on the capability information and the channel occupation information.

11. The wireless communication station of claim 10, wherein the communication module is further configured for detecting a response to said beacons sent on the clearest channel, and if a response is not detected, then selecting a next clearest channel and transmitting beacons on the next clearest channel.

12. The wireless communication station of claim 11, wherein the convergence module is further configured for performing bandwidth reservation on the selected data channel for ad-hoc communication with the partner station.

13. A wireless communication station, comprising:
a communication module configured such that when the station is associated to a coordinator, the communication module transmitting beacons randomly within unreserved channel time blocks, and transmitting a bandwidth reservation request to the coordinator to reserve a control channel time for control message exchange between the discovering station and the partner station; and
a convergence module configured for receiving a response from a partner wireless station outside coverage of the coordinator, for establishing communication with the partner station on a wireless data channel.

14. The wireless communication station of claim 13, wherein the communication module is further configured for transmitting a beacon on a control channel including coordinator channel reservation schedule information and infrastructure mode information.

15. The wireless communication station of claim 14, wherein the communication module is configured such that if the reservation request is denied, then the communication module disassociates a wireless communication station from the coordinator and transmits a control channel recommendation to the partner station.

16. The wireless communication station of claim 15, wherein the communication module is further configured such that, upon detecting a recommended control channel confirmation from the partner station, the communication module transmitting beacons to the partner station on the recommended control channel to establish a data channel between the discovering station and the partner station.

17. The wireless station of claim 16, wherein the data channel comprises a 60 GHz frequency band communication channel.

18. A wireless communication system, comprising:
a wireless discovering station and a wireless partner station;
the discovering station comprising:
a communication module configured for performing device discovery by scanning a wireless control channel to discover a wireless partner station for a new transmission comprising:
scanning one or more wireless channels to discover a wireless partner station by detecting peak energy and beacons on each scanned channel, and if a beacon is not detected, then selecting the clearest channel among the scanned channels, and transmitting beacons on the clearest channel; and
a convergence module configured such that upon detecting a beacon from a partner station, the convergence module establishes association with the partner station and selecting a wireless data channel for communication with the partner station.

19. The system of claim 18, wherein:
the control channel comprises a default control channel; and
the convergence module is further configured for communicating capability information and channel occupation information with the partner station, and selecting a wireless data channel based on the capability information and the channel occupation information.

20. The system of claim 19, wherein the communication module is further configured for:
detecting a response to said beacons sent on the clearest channel, and if a response is not detected, then selecting a next clearest channel and transmitting beacons on the next clearest channel.

21. A wireless communication system, comprising:
a wireless discovering station, a wireless partner station and a coordinator; and
the discovering station comprising:
a communication module configured such that when the station is associated to a coordinator, the communication module transmits beacons randomly within unreserved channel time blocks, and transmitting a bandwidth reservation request to the coordinator to reserve a control channel time for control message exchange between the discovering station and the partner station; and
a convergence module configured for receiving a response from a partner wireless station outside coverage of the coordinator, for establishing communication with the partner station on a wireless data channel.

22. The system of claim 21, wherein the communication module is further configured for transmitting a beacon on a control channel including coordinator channel reservation schedule information and infrastructure mode information.

23. The system of claim 22, wherein the communication module is configured such that:
if the reservation request is denied, then the communication module disassociates a wireless communication station from the coordinator and transmits a control channel recommendation to the partner station; and
upon detecting a recommended control channel confirmation from the partner station, the communication module transmitting beacons to the partner station on the recommended control channel to establish a data channel between the discovering station and the partner station.

* * * * *